April 29, 1952 — P. B. REEVES — 2,595,203

MULTIPLE EXPANSIBLE PULLEY UNIT

Filed May 19, 1949

INVENTOR.
PAUL B. REEVES,
BY: Harold B. Hood.
ATTORNEY.

Patented Apr. 29, 1952

2,595,203

UNITED STATES PATENT OFFICE 2,595,203

MULTIPLE EXPANSIBLE PULLEY UNIT

Paul B. Reeves, Columbus, Ind., assignor to Reeves Pulley Company, Columbus, Ind., a corporation of Indiana Application May 19, 1949, Serial No. 94,094

6 Claims. (Cl. 74—230.17)

The present invention relates to a multiple expansible pulley unit, and is particularly concerned with the provision of a variable speed power transmission device in the nature of a jack shaft unit, comprising two V pulleys, mounted upon a common axis, and equally and oppositely variable in effective diameters. While devices intended to function in substantially the same manner have been known before, it is the primary object of my present invention to provide such a unit having novel structural characteristics which contribute to facility and reduced cost of manufacture, without detracting from the operative characteristics of the assembly. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
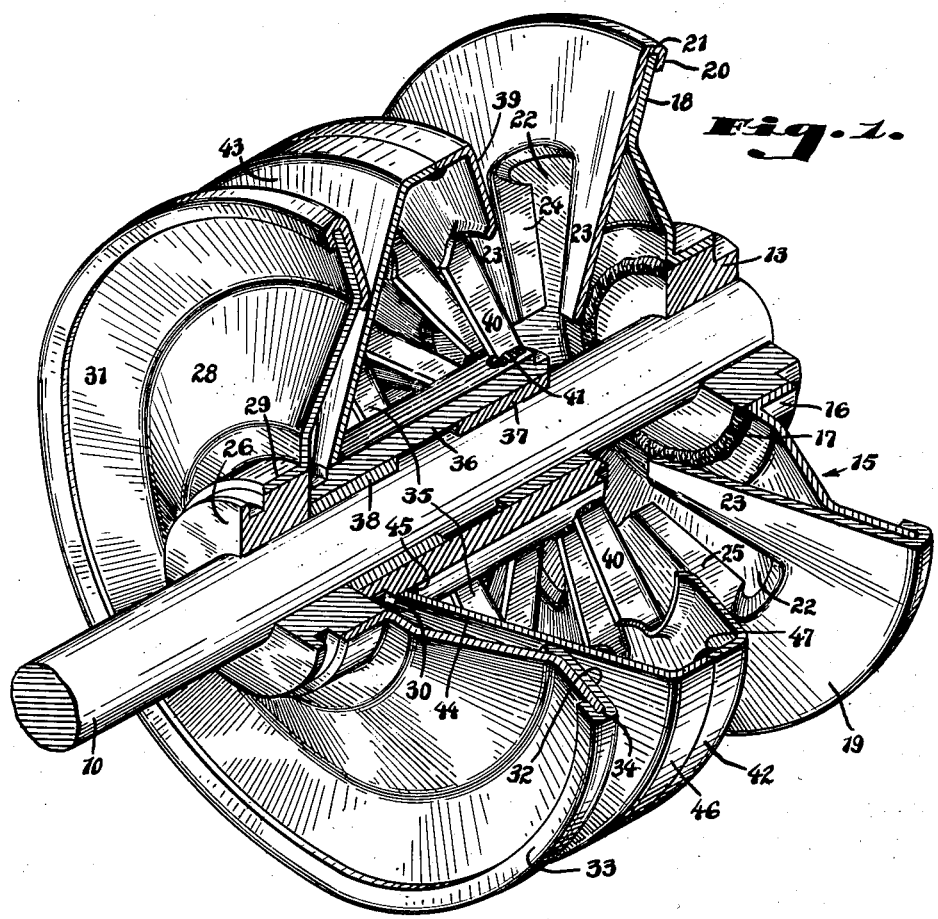
Figure 2:
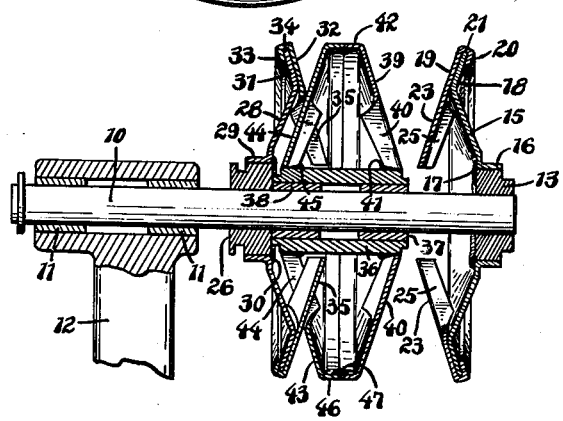

Fig. 1 is a broken perspective view of a unit constructed in accordance with my invention; and Fig. 2 is a central section therethrough, drawn to a reduced scale.

In the illustrated embodiment of my invention, a shaft 10 is supported for rotation and reciprocation in a pair of self-lubricating bearings 11 mounted in a suitable bracket 12. A hub 13 has a press fit on the outboard end of the shaft 10, and carries an annular disc of sheet metal indicated generally by the reference numeral 15. Said disc or annulus 15 is formed, at its inner periphery, with an axially-elongated tubular flange 16 projecting out of the general plane of the disc 15 in a direction away from the bracket 12. The flange 16 is fixedly supported upon the periphery of the hub 13, being secured thereto in any suitable manner as, for instance, by silver soldering or welding as indicated at 17.

The outer peripheral portion of the disc 15 is conically inclined, as at 18; and a coned annulus 19 of sheet metal is assembled with the annulus 15, the conical inclination of said element 19 corresponding to that of the portion 18 of the disc 15, so that the annulus 19 is flatly supported upon said disc portion 18, and the outer peripheral portion 20 of the annulus 19 being clinched upon the extreme outer periphery 21 of the disc 15 in the manner clearly illustrated in the drawings, whereby the elements 15 and 19 are rendered functionally unitary.

In its inner peripheral region, the element 19 is formed with a plurality of peripherally spaced interruptions or slots 22 defining radially-extending peripherally spaced fingers 23. Each of said fingers 23 is laterally bounded by flanges 24 and 25 turned from the conical surface of the element 19 in the direction of the element 15. The flanges 24 and 25, of course, substantially stiffen the fingers 23; yet, because of the particular relation between the fingers 23 and the flanges 24 and 25, no raw or rough edges are presented to the belt (not shown) which is to run in frictional contact with the coned surface of the element 19.

A second hub 26 has a press fit on the shaft 10 at a point axially spaced from the hub 13 in the direction of the bracket 12; and a sheet metal annulus 28, having an axially-extending flange 29, is supported on the hub 26. The annulus 28 is in all respects similar to the annulus 15, and its flange 29 is fixedly secured to the periphery of the hub 26 as, for instance, by silver soldering or welding, as indicated at 30, but said annulus 28 is mounted on the hub 26 in allochiral relation to the annulus 15, so that its flange 29 extends axially away from the hub 13.

The outer peripheral portion 31 of the annulus 28 is conically inclined to support a coned sheet metal annulus 32 whose outer peripheral portion 33 is clinched about the external periphery 34 of the annulus 28. The element 32 is formed to provide fingers 35 similar in all respects to the fingers 23 of the annulus 19.

A third hub 36 is supported from the shaft 10 in a location intermediate the hubs 13 and 26. The hub 36 is mounted for axial reciprocation relative to the shaft 10, and, in the illustrated embodiment of the invention, is supported upon axially spaced, self-lubricating bearings 37 and 38. The hub 36 and/or its bearings 37 and 38 may be suitably splined on the shaft 10; but such splining is not necessary, for reasons which will appear hereinafter; and I have shown no such splining arrangement.

A coned sheet metal annulus 39 is mounted upon the hub 36 in mating, facing relation to the element 19. The inner peripheral portion of the element 39 is interrupted to define fingers 40 similar in all respects to the fingers 23, and the inner ends of said fingers are welded, as at 41, or otherwise suitably secured, to the hub 36. The outer peripheral portion of the element 39 is formed to provide an axially-extending flange 42 concentric with the shaft 10, and projecting axially away from the element 19.

A further coned, sheet metal annulus 43, similar in all respects to the annulus 39, is mounted upon the hub 36, in allochiral relation to the annulus 39. The annulus 43 is provided with fingers 44 similar in all respects to the fingers 40, and the inner ends of said fingers are fixedly secured, as by welding 45 or the like, to the hub 36. As is clearly to be seen in the drawings, the fingers 40 are secured to the hub 36 approximately at its end adjacent the element 19, while the fingers 44 are secured to said hub approximately at its end adjacent the element 32. The annulus 43 is provided with an outer peripheral flange 46, concentric with the shaft 10 and projecting axially in a direction away from the element 32; and the parts are so proportioned and designed that, when the fingers 40 and 44 are suitably fixed to the hub 36, the axial extremities of the flanges 42 and 46 will lie in abutment. Said axial extremities are fixedly secured together as by spot welding, silver soldering, or brazing, as indicated at 47 to siffen the entire assembly comprising the hub 36 and the annuli 39 and 43.

That assembly is so arranged on the shaft 10 that the fingers 40 are staggered with relation to the fingers 23 for interdigitation therewith, while the fingers 44 are staggered with relation to the fingers 35 for interdigitation therewith; and the spacing between the hubs 13 and 26 is so related to the proportions of the four coned annuli that, as the hub 36 moves toward the right from the position in which it is illustrated in Fig. 2, the fingers 40 will enter into interdigitation with the fingers 23 before the fingers 44 leave their interdigitation with the fingers 35. Preferably, but not necessarily, the fingers 44 will be staggered with relation to the fingers 40.

It will be clear that a belt of V cross section will, in operation, be engaged between the annuli 32 and 43, said annuli cooperating to provide a V pulley; while a similar belt will be engaged between the annuli 19 and 39. With the parts in their illustrated positions, if the belt engaging between the annuli 32 and 43 leads from a driving shaft while that engaged between the annuli 19 and 39 leads to a driven shaft, it will be clear that the driven shaft will be rotated at a velocity less than that of the driving shaft.

If, now, the parts are adjusted to cause the hub 36 to approach the hub 13, the effective diameter of the pulley defined by the annuli 32 and 43 will be progressively decreased, while the effective diameter of the pulley defined by the annuli 19 and 39 will be correspondingly progressively increased, whereby the velocity of the driven shaft will be progressively increased. In some organizations embodying the present invention, the bracket 12 will be mounted to move in such a direction as to result in transaxial shifting of the shaft 10, whereby the relation between the hub 36 and the hubs 13 and 26 may thus be varied. Preferably, the shaft 10 will be so supported that, as such adjustment occurs, the shaft 10 will move axially in its bearings 11 to maintain belt alignment throughout such adjustment.

I claim as my invention:

1. A variable-speed power transmission device comprising a trunnion element, a first hub coaxially supported from said trunnion element for rotation about the axis thereof, a second hub coaxially supported from said trunnion element and axially spaced from said first hub for rotation about said axis, said hubs being restrained against axial separation, a first sheet-metal annulus having a tubular flange at its inner periphery fixedly sleeved on said first hub and projecting out of the general plane of said annulus in a direction away from said second hub, a first coned sheet-metal annulus located wholly on that side of said first annulus adjacent said second hub, having its outer periphery clinched to the outer periphery of said first annulus, and having its inner periphery adjacent said trunnion element, a second sheet metal annulus having a tubular flange at its inner periphery fixedly sleeved on said second hub and projecting out of the general plane of said second annulus in a direction away from said first hub, a second coned sheet metal annulus located wholly on that side of said second annulus adjacent said first hub, having its outer periphery clinched to the outer periphery of said second annulus, and having its inner periphery adjacent said trunnion element, a third hub coaxially supported from said trunnion element intermediate said first and second hubs for rotation and axial reciprocation relative to said axis, a third coned sheet metal annulus having its inner periphery fixedly secured to said third hub adjacent said first coned sheet metal annulus and cooperating therewith to define a V-pulley, and a fourth coned sheet metal annulus having its inner periphery fixedly secured to said third hub adjacent said second coned sheet-metal annulus and cooperating therewith to define a V-pulley.

2. The device of claim 1 in which the coned surface of each of said coned annuli is interrupted in a plurality of peripherally spaced regions to define a plurality of spaced fingers near the inner periphery thereof, and in which the fingers of each such annulus are peripherally staggered with relation to the fingers of the cooperating annulus for interdigitation therewith.

3. The device of claim 2 in which the fingers of said third coned annulus are further peripherally staggered relative to the fingers of said fourth coned annulus.

4. The device of claim 1 in which the outer periphery of said third coned annulus is provided with an axially projecting flange extending toward said fourth coned annulus and said fourth annulus is provided with an axially projecting flange extending toward said third coned annulus, said flanges being secured together.

5. The device of claim 1 in which said third hub is supported from said trunnion element by friction-reducing bearing means.

6. The device of claim 1 including a bearing element interposed radially between each end of said third hub and said trunnion element.

PAUL B. REEVES.

REFERENCES CITED

The following references are of record in the file of this patent:

UNITED STATES PATENTS

| Number | Name | Date |
| --- | --- | --- |
| 1,900,222 | Bowen | Mar. 7, 1933 |
| 2,050,358 | McElroy | Aug. 11, 1938 |
| 2,293,230 | Waltz | Aug. 18, 1942 |

FOREIGN PATENTS

| Number | Country | Date |
| --- | --- | --- |
| 5,012 | Great Britain | 1903 |
| 30,168 | Great Britain | 1910 |